United States Patent
Kar et al.

(10) Patent No.: US 11,436,443 B2
(45) Date of Patent: Sep. 6, 2022

(54) TESTING MACHINE LEARNING (ML) MODELS FOR ROBUSTNESS AND ACCURACY USING GENERATIVE DEEP LEARNING

(71) Applicant: ACCENTURE GLOBAL SOLUTIONS LIMITED, Dublin (IE)

(72) Inventors: Indrajit Kar, Bangalore (IN); Shalini Agarwal, Mumbai (IN); Vishal Pandey, Bangalore (IN); Mohammed C. Salman, Bangalore (IN); Sushresulagna Rath, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 351 days.

(21) Appl. No.: 16/867,191

(22) Filed: May 5, 2020

(65) Prior Publication Data
US 2021/0287050 A1    Sep. 16, 2021

(30) Foreign Application Priority Data
Mar. 16, 2020  (IN) ............................ 202011011268

(51) Int. Cl.
*G06K 9/62*      (2022.01)
*G06T 7/00*      (2017.01)
*G06N 3/04*      (2006.01)

(52) U.S. Cl.
CPC ......... *G06K 9/6262* (2013.01); *G06K 9/6228* (2013.01); *G06N 3/0454* (2013.01); *G06T 7/0002* (2013.01); *G06T 2207/20081* (2013.01); *G06T 2207/20084* (2013.01)

(58) Field of Classification Search
CPC .. G06K 9/6262; G06K 9/6228; G06N 3/0454; G06N 3/084; G06N 3/088; G06N 3/0481; G06N 3/0472; G06T 7/0002; G06T 2207/20081; G06T 2207/20084; G06V 10/774; G06V 10/776
USPC ....................................................... 382/155
See application file for complete search history.

(56) References Cited

U.S. PATENT DOCUMENTS

2017/0103532 A1    4/2017  Ghesu et al.

*Primary Examiner* — Stephen P Coleman
(74) *Attorney, Agent, or Firm* — Mannava & Kang, P.C.

(57) ABSTRACT

A model testing system administers tests to machine learning (ML) models to test the accuracy and the robustness of the ML models. A user interface (UI) associated with the model testing system receives selections of one or more of a plurality of tests to be administered to a ML model under test. Test data produced by one or more of a plurality of testing ML models that correspond to the plurality of tests is provided to the ML model under test based on the selected tests. One or more of a generative patches test, a generative perturbations test and a counterfeit data test can be administered to the ML model under test based on the selections.

20 Claims, 12 Drawing Sheets

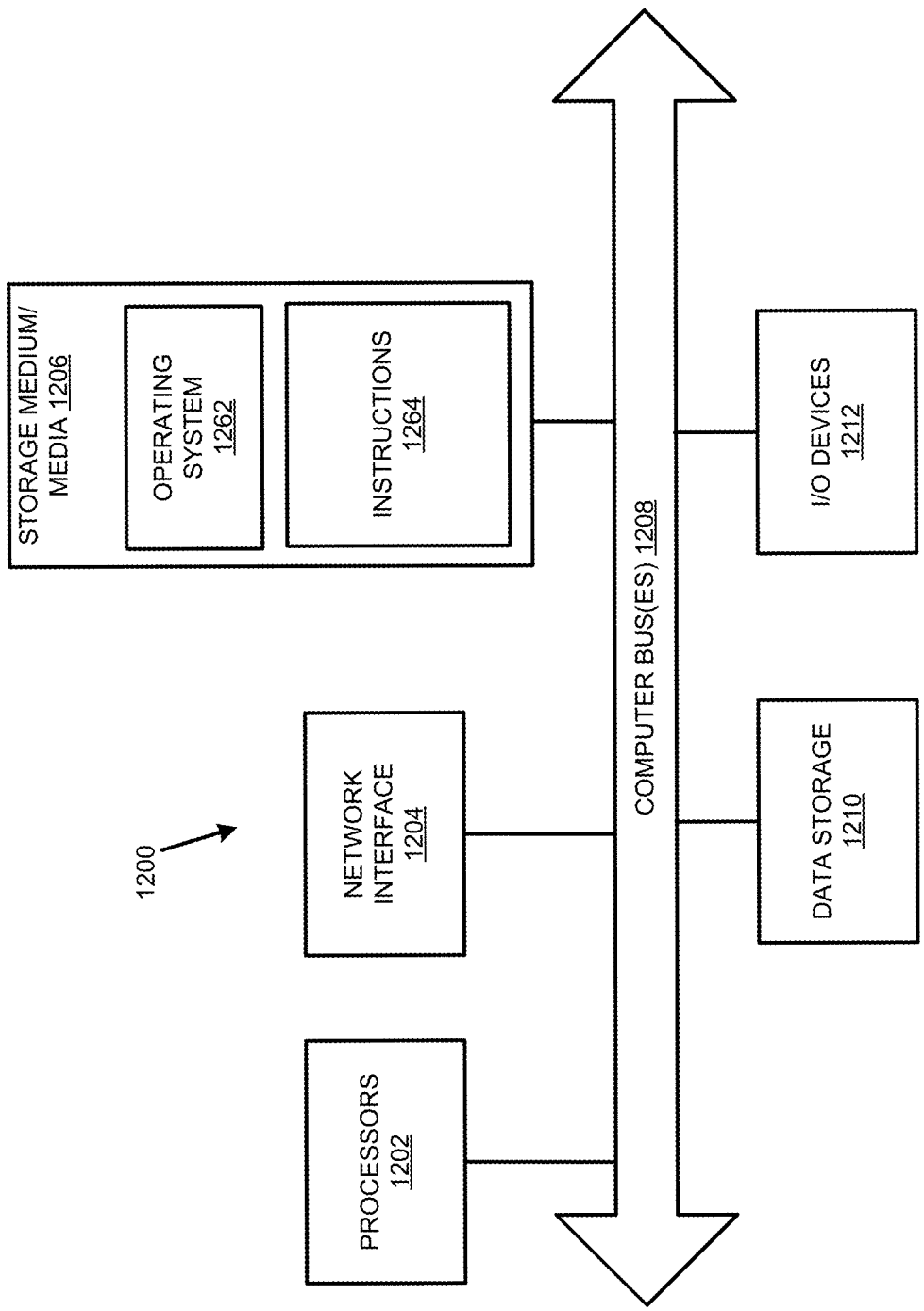

TESTING MACHINE LEARNING (ML) MODELS FOR ROBUSTNESS AND ACCURACY USING GENERATIVE DEEP LEARNING

RELATED APPLICATION

The present disclosure claims priority to Indian Patent Application No. 202011011268, filed Mar. 16, 2020, the disclosure of which is hereby incorporated by reference.

BACKGROUND

Artificial Intelligence is a rapidly growing field. Machine Learning (ML) is a part of AI that gives power to computerized systems to automatically learn from experience gathered during prior transactions without having to be explicitly programmed. ML incorporates computer models that can use the datasets from the prior transactions to train themselves using techniques such as supervised learning, unsupervised learning, reinforcement learning, etc. One aspect of ML includes deep learning which is used in applications such as driverless cars for identification of objects, classification of the identified objects, etc. Quality testing in ML and deep learning systems can include testing for learning efficiency, adaptation, performance of the system, etc. Benefits such as tweaking the ML models for greater accuracy, preventing malfunctions and keeping untested code out of production platforms can ensue with proper testing.

BRIEF DESCRIPTION OF DRAWINGS

Features of the present disclosure are illustrated by way of examples shown in the following figures. In the following figures, like numerals indicate like elements, in which:

FIG. 12 illustrates a computer system that can be used to implement the model testing system.

DETAILED DESCRIPTION

Figure 1:
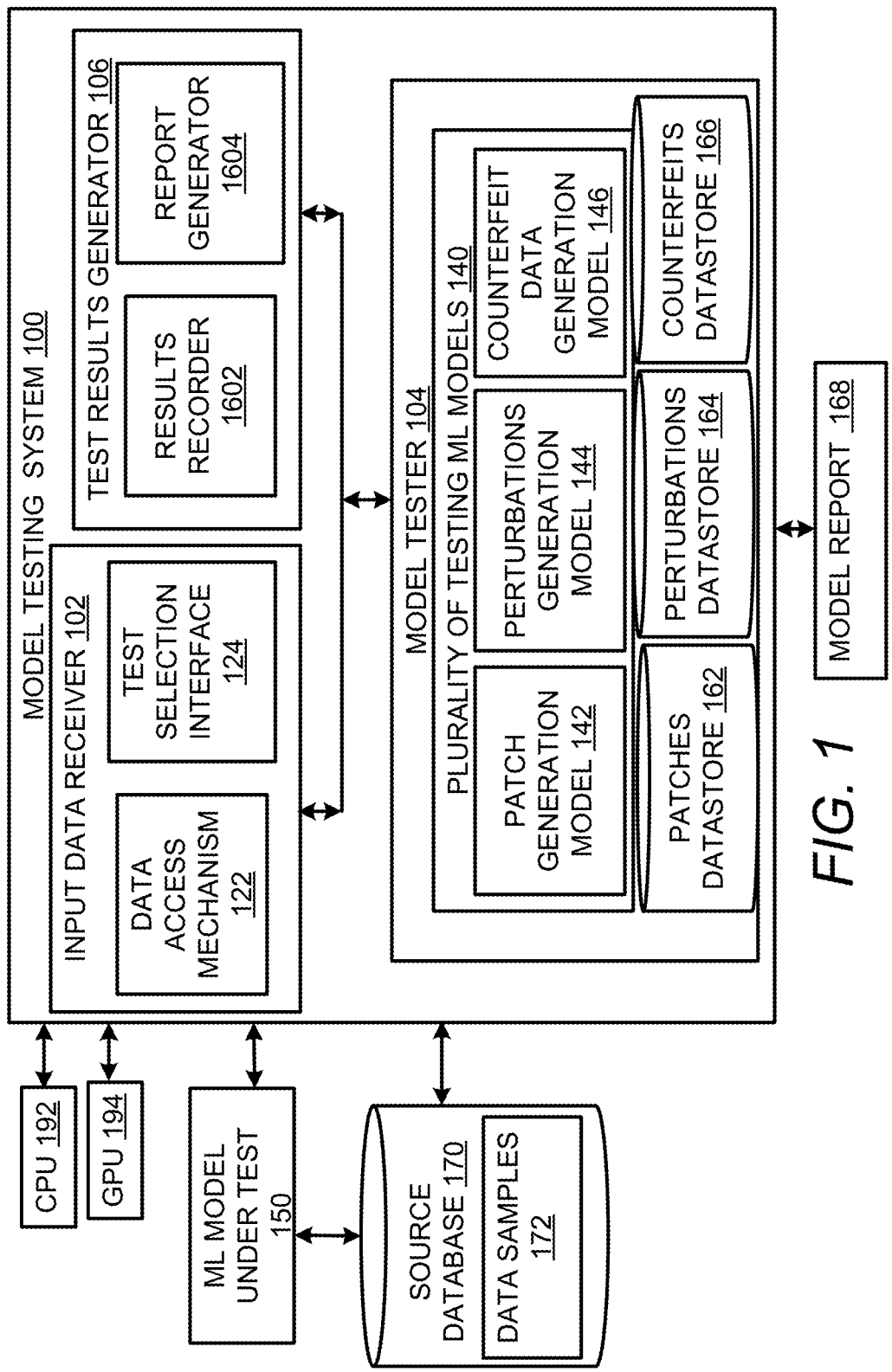
FIG. 1 shows a block diagram of a model testing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A ML-based model testing system that tests ML models for accuracy and robustness is disclosed. The model testing system is configured to administer at least one of a plurality of tests to a ML model under test that may be employed by an external system to execute tasks associated with the external system. The model testing system can include a selection interface that receives selection of one or more of the plurality of tests to be administered to the ML model under test. Each of the plurality of tests involves providing to the ML model under test, data generated by a corresponding testing ML model from a plurality of testing ML models. The output from administering the one or more tests is collected and checked for accuracy. If the output from the ML model under test is accurate, the test is successful and the ML model is determined to be robust and eligible for use within the external system. Else, if the ML model under test produces inaccurate output, the test result is considered a failure and a suggestion is generated for further training of the ML model under test. A test results generator includes a results recorder that stores the result of the tests administered to the ML model under test. A report generator may also be included in the test results generator to produce a report regarding the tests administered to the ML model under test, the results of the tests and any suggestions to be provided for improving model performance.

In an example, each of the plurality of tests includes accessing a source database that stores the training data with data samples that are used for training the ML model under test. At least a subset of the data samples are provided to each of the plurality of testing ML model to obtain a corresponding modified data set. The modified data samples. The modified data samples that are produced by each of the plurality of ML testing models from the subset of data samples are stored as the test data for each of the different tests. The test data for the various tests may be saved to different datastores.

In an example, the data samples can include image data and the ML model under test is trained to execute image processing tasks such as object identification or image classification, etc. The plurality of tests to be administered to the ML model under test can include a generative patches test, a generative perturbations test and a counterfeit data test. The test data for the generative patches test is produced by a patch generation model. An adversarial patch can include a modification to one or more of the temporal and spatial features of an input data that causes the ML model under test to return an incorrect result. An adversarial patch which is applied to an image is likely to be perceptible by a human observer but may not be detected by an AI system. The test data therefore includes images from the source database that are modified with patches. The modified data samples including the patches are stored to a patches datastore and provided to the ML model under test when the generative patches test is selected. Similarly, a subset of the data samples can be provided to a perturbations generation model to obtain modified data samples when the generative perturbation test is selected. The modified data samples from the perturbations generation model include at least a subset of the images from the source database that include perturbations. Perturbations include a combination of unnoticeable or nearly unnoticeable but significant changes distributed across the input data which cause the model to return an incorrect result. For an image, this can include small changes to several disparate pixels across an image. The modified data samples including modified pixel data thus produced by the perturbations generation model are stored to a perturbations datastore. When the generative perturbation test is to be administered to the ML model under test, the modified data samples from the perturbations datastore are provided to the ML model under test as test data. Similarly, the counterfeit data test includes providing counterfeit data samples produced by a counterfeit data model to the ML model under test. The counterfeit data model accesses the subset of data samples, such as images, from the source database and produces counterfeit images that are similar to the images from the source database. The counterfeit images are stored as the test data to the counterfeits datastore. Based on the user selection of the plurality of tests, modified data samples from one or more of the patches datastore, perturbations datastore and the counterfeit datastore are provided to the ML model under test.

In an example, each of the patch generation model, the perturbations generation model and the counterfeit data generation model are based on generative adversarial networks (GANs). A GAN includes at least a generator and a discriminator wherein the generator is in a feedback loop with the discriminator. The generator includes a neural network that is trained to generate synthetic data e.g., synthetic images from a given domain that are provided to the discriminator which is trained to discriminate between the synthetic images and original domain data e.g., original images of real-world objects captured by image capture devices such as cameras. In the case of the patch generation model, the generator synthesizes the modified data samples including the patches and provides the modified data samples to the corresponding discriminator included in the patch generation model. The discriminator produces a probability that is indicative of the likelihood of the modified data sample being a part of the source database. If the probability of the modified data sample belonging to the source database is high, then such data samples are stored as the test data to the patches datastore. Similarly, the perturbations generation model includes a GAN wherein the generator produces modified data samples including perturbations and the discriminator generates probabilities that are indicative of the likelihood of the modified data samples being a part of the source database. Those data samples with high likelihood of belonging to the source database are stored to the perturbations datastore. The feedback loop transmits the output of the discriminator to the generator thereby enabling the generator to determine if higher quality data samples are needed, i.e., if the generator requires more training to generate the modified data samples with sufficient quality that can secure higher probabilities from the discriminator.

Different ML models exist for analyzing different types of data such as, image, speech, text, numeric, audio and video data. Data of different types and differing formats is ingested into the ML or deep learning models which are then expected to solve a problem or automate a task by training on the data. Despite the efforts expended on training the ML models, the systems employing ML models may produce inaccurate results when the data is misused and is used to fool the ML or deep learning systems. The model testing system as disclosed herein provides for testing ML models that are employed for automating tasks in various industries. More particularly, the model testing system employs generative modeling techniques for identifying vulnerabilities of target systems. Generative modeling is an unsupervised learning task in ML that involves automatically discovering and learning the patterns in input data in a manner that the ML model can be used to generate or output new examples that plausibly could have been drawn from the original data set. This data is reused by the model testing system as disclosed herein to make the ML model under test robust against adversarial attacks without the need for further training data. In fact, by employing generative models, the model testing system can ease the process of data generation which can be otherwise cumbersome. Hence, it can be determined if the ML models are accurate and robust or if the ML models require further training or configuration changes such as tweaking of hyper-parameters to improve accuracy and/or robustness. Although examples are discussed throughout the application relate to image processing, the elements of the ML model testing system disclosed herein can be extended to speech, text, numeric or even video data.

The different ML models such as but not limited to, surveillance models, classification models, automatic digital analysis tools, web filters, models for touchless monitoring systems are employed for automatic tasks in various industries including domains where autonomous decision systems (ADS) may be adopted. Some of the example applications are discussed herein by way of illustration and not limitation. One of the industries employing ML models includes the insurance industry where computer vision is used to build AI systems for generating estimates for repairing parts, labor and classifying the kind of damage and even the extent of damage to various objects that may be covered by different insurance products such as vehicles which may be covered by auto-insurance, homes which may be covered by home-owner or renter policies or even human bodies which are covered by health insurance policies. However, the instances wherein a vast quantity of loss adjustment data is pending, an inadequate verification and assessment process can enable fraudulent claims to creep into the system. Furthermore, such automatic ML model-based systems can be driven by applications which are vulnerable to adversarial attacks and misleading attempts.

One such example includes a touchless (autonomous) claims processing system which is opened to public for data uploads for claims processing. This makes the service vulnerable to the influx of adversarial data which can cause the denial of service. In the denial of service attack, a generative model can generate or synthesize numerous adversarial images and clog the touchless claims processing system thereby preventing the touchless claims processing system from functioning smoothly and fulfilling the purpose for which it is built. The adversarial images need not be perturbation images only. In fact, any of the different types of images described herein can be used to circumvent the prediction and detection of a neural network to get to a point where the touchless claims processing system generates alerts which are unmanageable by the human operators thereby creating a huge backlog of adversary images and alerts.

Evaluating ML-based systems such as deep neural networks on test dataset, leveraging k-fold cross validation or similar approaches can solidify accuracy, precision, recall, F1 score, etc. However, it is also important to test the ML models on adversarial images as such testing can increase the robustness and reliability of any ML based system. The model testing system including the plurality of tests generates adversarial examples using GANs. Within the GAN framework, trained feed-forward generators can produce adversarial patches/perturbations efficiently. The model testing system can also perform both semi-white box and black-box attacks with high attack success rate. In addition, when GANs are applied to generate adversarial instances on different models without the knowledge of the defenses in place, the generated adversarial examples can preserve high perceptual quality and attack the state-of-the-art defenses with higher attack success rate than examples generated by other testing systems. The model testing system therefore provides for more rigorous testing which can identify vulnerabilities in ML-based target systems that may not be otherwise identified.

FIG. 1 shows a block diagram of a model testing system 100 in accordance with the examples disclosed herein. The model testing system 100 can be communicatively coupled to a ML model 150 which is to be tested for vulnerabilities related to accuracy and robustness. Various types of ML models that analyze data of different formats can be tested with the model testing system 100. For example, the ML model under test 150 can be trained on textual data to execute tasks related to text such as generating textual content confirming to summarizing textual content. In an example, the ML model under test 150 can include a deep learning network (DLN) for object identification so that the ML model under test 150 can analyze images and identify objects from the images. In another example the ML model under test 150 can include an image search model for identifying images that are similar to a received input image. Although ML models related to image data are discussed as examples infra, it can be appreciated that the methodologies discussed herein can be adopted to test the quality of ML models related to other data types such as textual data, voice data, etc.

A source database 170 that stores data samples 172 related to training the ML model under test 150 is accessible to the model testing system 100. Depending on the type of data being analyzed by the ML model under test 150, the data samples 172 can include textual data, audio data, image and/or video data. In an example, the ML model under test 150 which processes image data for object identification or for image search can be employed in a sector such as the insurance domain for automatically processing claims related to damaged objects such as damaged vehicles. Therefore, it is important that the ML model under test 150 be tested for vulnerabilities so that an automatic claim processing system based on the ML model under test 150 does not erroneously allow duplicate claims directed towards an already claimed damage or counterfeit claims based on counterfeit images.

The model testing system 100 includes an input data receiver 102, a model tester 104 and a test results generator 106. The input data receiver 102 can include a data access mechanism 122 such as an upload UI that allows the model testing system 100 to access the source database 170. The input data receiver 102 can also provide a test selection interface 124 that enables a user to select one or more of a plurality of tests to be applied to an ML model under test 150 by presenting options for selection, via a UI for example.

The data samples from the source database 170 are provided to one or more of a plurality of testing ML models 140 included in the model tester 104 for testing the ML model under test 150. The model testing system 100 can include a processor 192 and a graphics processing unit (GPU) 194 if the data samples from the source database 170 include images so that the data samples 172 can be processed for generating test data for the ML model under test 150. The model tester 104 is configured with a plurality of testing ML models 140 that produce different types of test data used to administer different types of tests to the ML model under test 150.

The plurality of testing ML models 140 are each trained via unsupervised learning to administer a corresponding test. Alternately, the plurality of testing ML models 140 are trained for generating the modified data samples using unsupervised learning and the modified data samples are provided to the ML model under test 150 while executing the test. In an example, where the data samples 172 in the source database 170 include images, the model tester 104 enables a generative patches test to be administered by a patch generation model 142, a generative perturbation test to be administered by a perturbations generation model 144 and a counterfeit image test to be administered by a counterfeit data generation model 146. Each of the plurality of testing ML models 140 accesses the data samples 172 and produces a corresponding output that includes data samples modified by a particular model of the plurality of testing ML models 140. The modified data samples produced by each of the plurality of testing ML models 140 are stored to a respective test datastore. Accordingly, a patches datastore 162 can be used to store data samples which are modified by the patch generation model 142 by including patches in the data samples 172 from the source database 170. A perturbation datastore 164 can be used to store modified data samples from the perturbations generation model 144 which are generated by modifying the data samples 172 with perturbations. A counterfeits datastore 166 is used to store counterfeit images that are generated by the counterfeit data generation model 146 based on the data samples 172.

During the testing process, the modified data samples from one or more of the patches datastore 162, the perturbation datastore 164 and the counterfeits datastore 166 are provided to the ML model under test 150 based on the test selections received by the input data receiver 102 from the test selection interface 124. The output from the ML model under test 150 is recorded by a results recorder 1602 included in a test results generator 106. A successful result can be recorded if the output from the ML model under test 150 is accurate. For example, successful results are recorded when images from one or more of the patch datastore 162 or the perturbation datastore 164 are sent to ML model under test 150 which includes an object recognition ML model that accurately identifies the images even though its patched or perturbated. When the ML model under test 150 includes an image search ML model that correctly identifies counterfeits and or identifies previously searched images, when the counterfeit images from the counterfeits datastore 166 are identified by ML model under test 150, successful results are recorded. Conversely, an unsuccessful test result is recorded when the ML model under test 150 fails to record an accurate result. A report generator 1604, also included in the test results generator 106, obtains the successful test result and unsuccessful test result for each of the modified data samples provided to the ML model under test 150 and a model report 168 regarding the accuracy and robustness of the ML model under test 150 is generated. The model report 168 can be stored on a local datastore of the model testing system or in an external datastore or may be communicated to users via email, instant message, etc. Based on the model report 168 it can be determined if the ML model under test 150 is functioning well or if further configuration changes and/or training is required to obtain accurate results.

Figure 2:
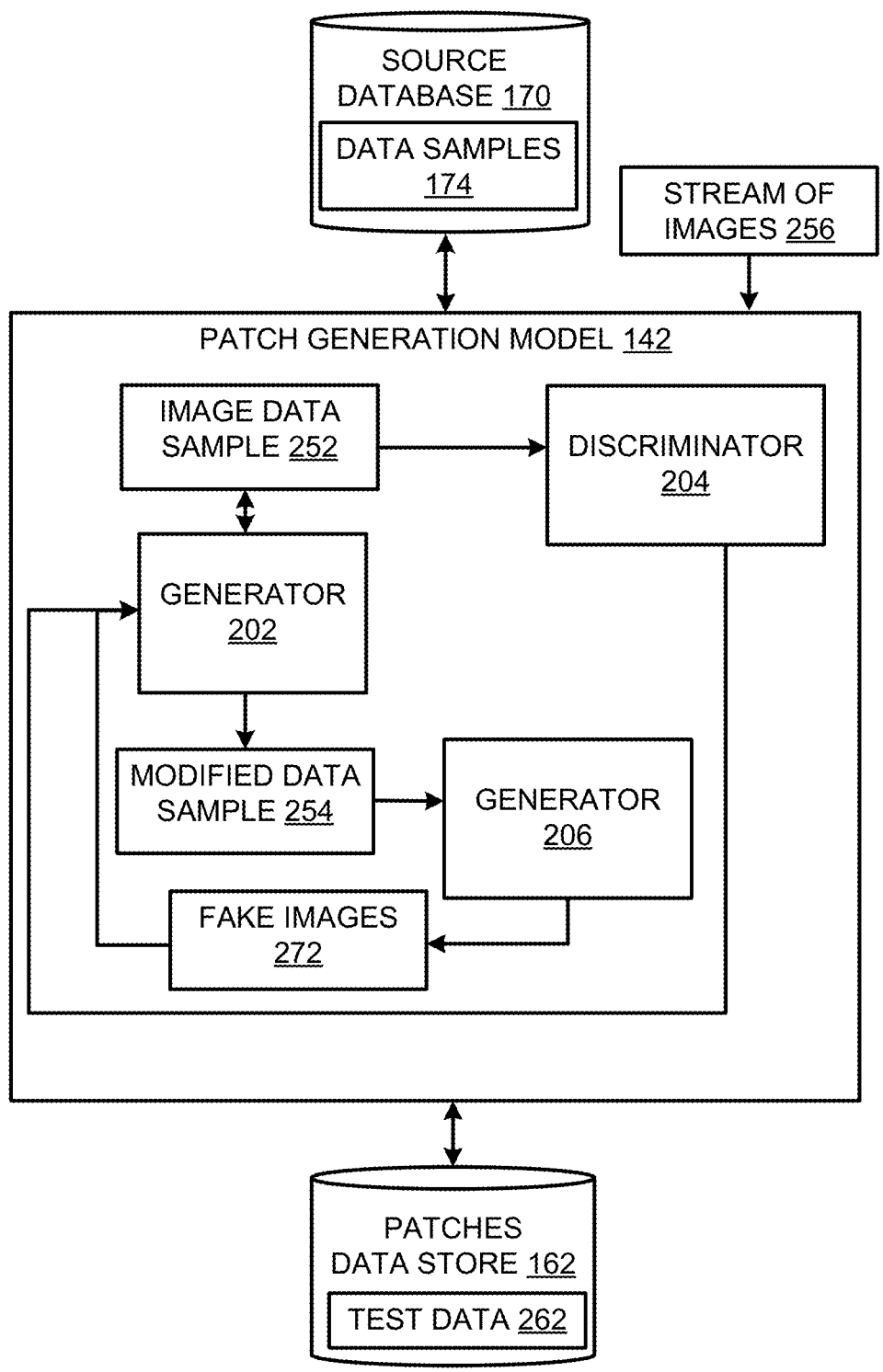
FIG. 2 shows a block diagram of a patch generation model in accordance with the examples disclosed herein.

FIG. 2 shows a block diagram of the patch generation model 142 in accordance with the examples disclosed herein. The plurality of testing ML models 140 can be based on generative models that create new data instances. Generative models can be trained on existing training data to create new data instances that resemble the training data e.g., images of new plants that look like real plants but don't actually exist can be created based on training data that includes images of real, existing plants. In an example, the plurality of testing ML models 140 can be GANs. GANs are a type of generative models that pair a generator that includes a neural network which learns to produce a target output with a discriminator that includes another neural network which learns to distinguish true data from the synthetic data produced by the generator.

Artificial Intelligence (AI) systems generally operate by learning tasks such as object identification from large volumes of data until general patterns emerge. However, such systems can sometimes become confused if they are presented with data that the AI system has not be trained to identify. For example, such unseen data can lead the AI system such as a classification system to misclassify a given image. Such images which hamper the operation of an AI system can be referred to adversarial patches. The patch generation model 142 is configured to receive one of the data samples 172 that include an image and generate a modified image with visible alterations. In an example, the patch generation model 142 can receive an image of an undamaged car and generate patches to alter the image so that the car looks like a hail-damaged car.

The patch generation model 142 includes at least two generators 202 and 206 along with a discriminator 204. The generator 202 receives an image data sample 252 from the source database 170, and generates a modified data sample 254 that includes a visibly altered image. For example, the generator 202 may receive an image of an undamaged car and visibly alter the image to show a car with patches that are electronically generated so that the modified image appears like a hail-damaged car. The modified image of the hail damaged car is provided to the discriminator 204 alongside a stream of images 256 taken from the actual, ground-truth dataset. In the above-referenced example, the ground-truth dataset would include numerous images of actual, hail damaged cars that were captured by imaging devices such as, cameras. The discriminator 204 thus takes in both real and fake images and returns probabilities as a number between 0 and 1, with 1 representing a prediction of authenticity and 0 representing fake.

The discriminator 204 is in a feedback loop with the ground truth dataset. The generator 202 maintains a feedback loop with the discriminator 204 in order to receive the probabilities of the fake images produced by the generator 202. Based on the feedback, the generator 202 can be further trained to generate images with better quality that cause the discriminator 204 to generate higher probabilities for such fake, generated images so that the fake images are misclassified by the discriminator 204 as belonging to the ground truth dataset. Such images with patches and which have higher probabilities can be stored as test data 262 to the patches datastore 162 for testing the ML model under test 150. The patch generation model 142 further includes the generator 206 that is trained to further generate fake images 272 that are identical to the images received from the source database 170. The fake images 272 can be fed back to the generator 202 so that the generator 202 is able to generate modified images with patches that maintain the shape of the objects as included in the images from the source database 170. In an example, L2-norm known as least squares, enables minimizing the sum of the square of the differences (S) between the target value (Yi) and the estimated values (f(xi)).

Figure 3:
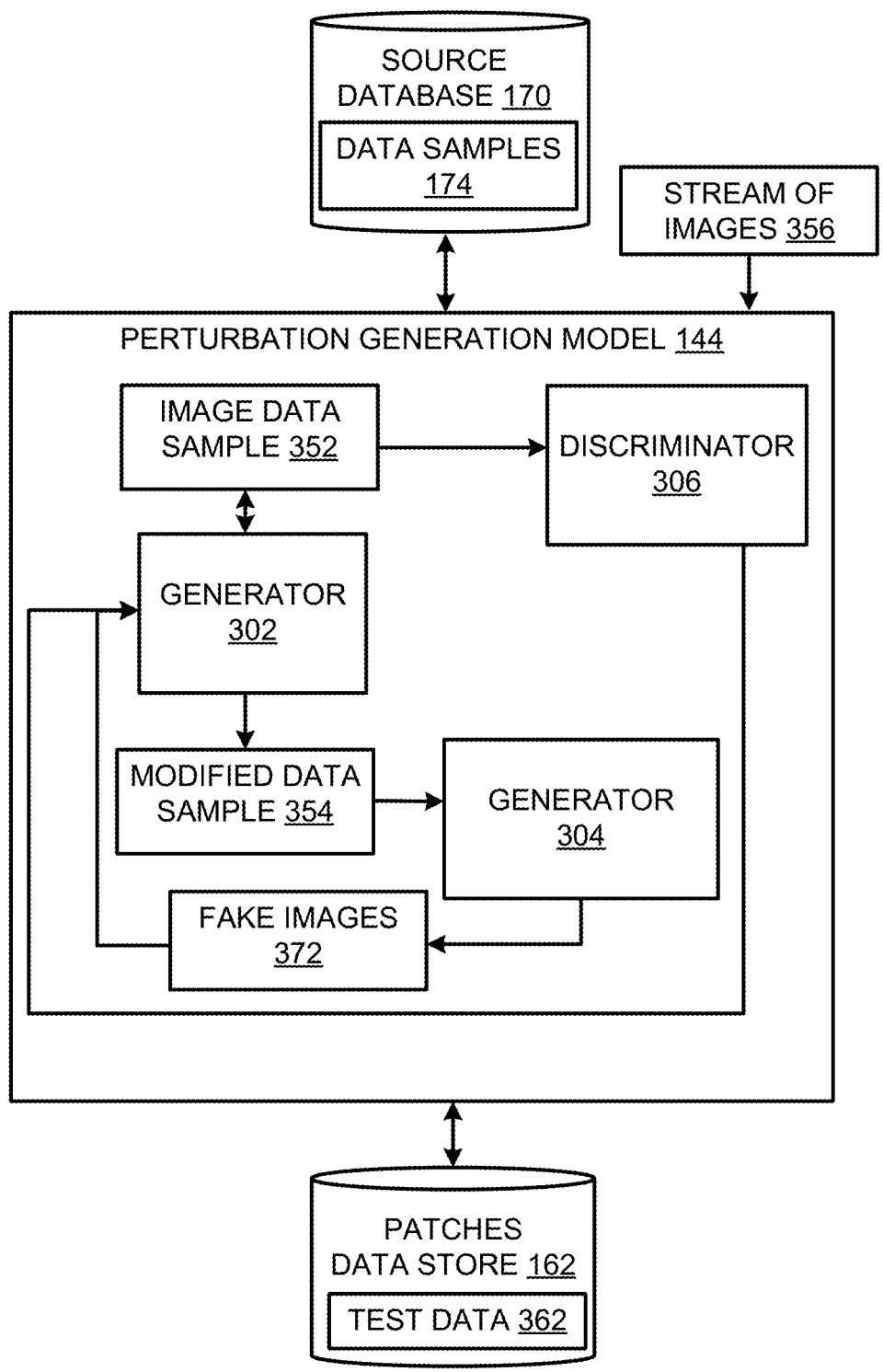
FIG. 3 shows a block diagram of a perturbations generation model in accordance with the examples disclosed herein.

FIG. 3 shows a block diagram of the perturbations generation model 144 in accordance with the examples disclosed herein. Perturbations include changes across input data that cause a model to return incorrect results. For example, if a Deep Neural Network (DNN) takes in a vector as input data and returns a class, the function would be represented as:

$$y = f(x; \theta) \qquad \text{Eq. (1)}$$

where f is the function applied by the DNN to generate the output. θ are the weights and biases of the network. (x, y) is the image-label pair where x is a real number and y is a single class. When some adversarial $x^a$ which is equal to x+ε is added, (e.g., Fast Gradient Signed Method (FGSM) finds the adversarial image $x^a$ by maximizing the loss. $L(x^a, y) = L(f(\theta, x^a), y)$ subject to the L∞ perturbation constraint where $\|x^a - x\|_\infty \leq \varepsilon$ with ε being the attack strength. For the input $x^a$ to be successfully adversarial, the output of the ML model under test 150 (e.g., the classification) must differ from that of a non-adversarial equivalent. This condition can be expressed as shown in Eq. (2) below since θ is frozen:

$$f(x^a) \neq f(s) \qquad \text{Eq. (2)}$$

In the case of a perturbation the value of the adversarial change (θ) is minimized to make it unnoticeable to the human eye. The aim is to find the closest image to an input image x with θ as a vector representing a small change to the original input data.

The perturbations generation model 144 also includes two generators 302, 304 with a discriminator 306. The operations of the generators 302, 304 and the discriminator 306 in the perturbations generation model 144 are similar to the operations described above with respect to the patch generation model 142. The generator 302 receives an image data sample 352 which is used to generate the modified data sample 354 by including small perturbations. For example, if x represents the input data sample and E represents a small change induced into one or more of the spatial and temporal data of the input data sample (x+ε) represents the modified data sample 354 which is fed to the discriminator 306 along with ground truth data. For example, original images of cars can be modified via perturbations to appear as collision-damaged cars. In this example, the discriminator 306 will receive a stream of images 356 of actual collision damaged cars in addition to the modified image. Again, the discriminator 306 generates probabilities with respect to all the received images and those images synthesized by the generator 302 and having high probabilities are stored as test data 362 in the perturbations datastore 164. The probabilities are fed back to the generator 302 synthesizing the false images. The generator 304 is trained on data including original images of real-world objects, for example, from the source database 170 to generate synthetic or fake images 372 that are identical to the original images. The fake images 372 are provided to the generator 302 for training purposes.

Figure 4:
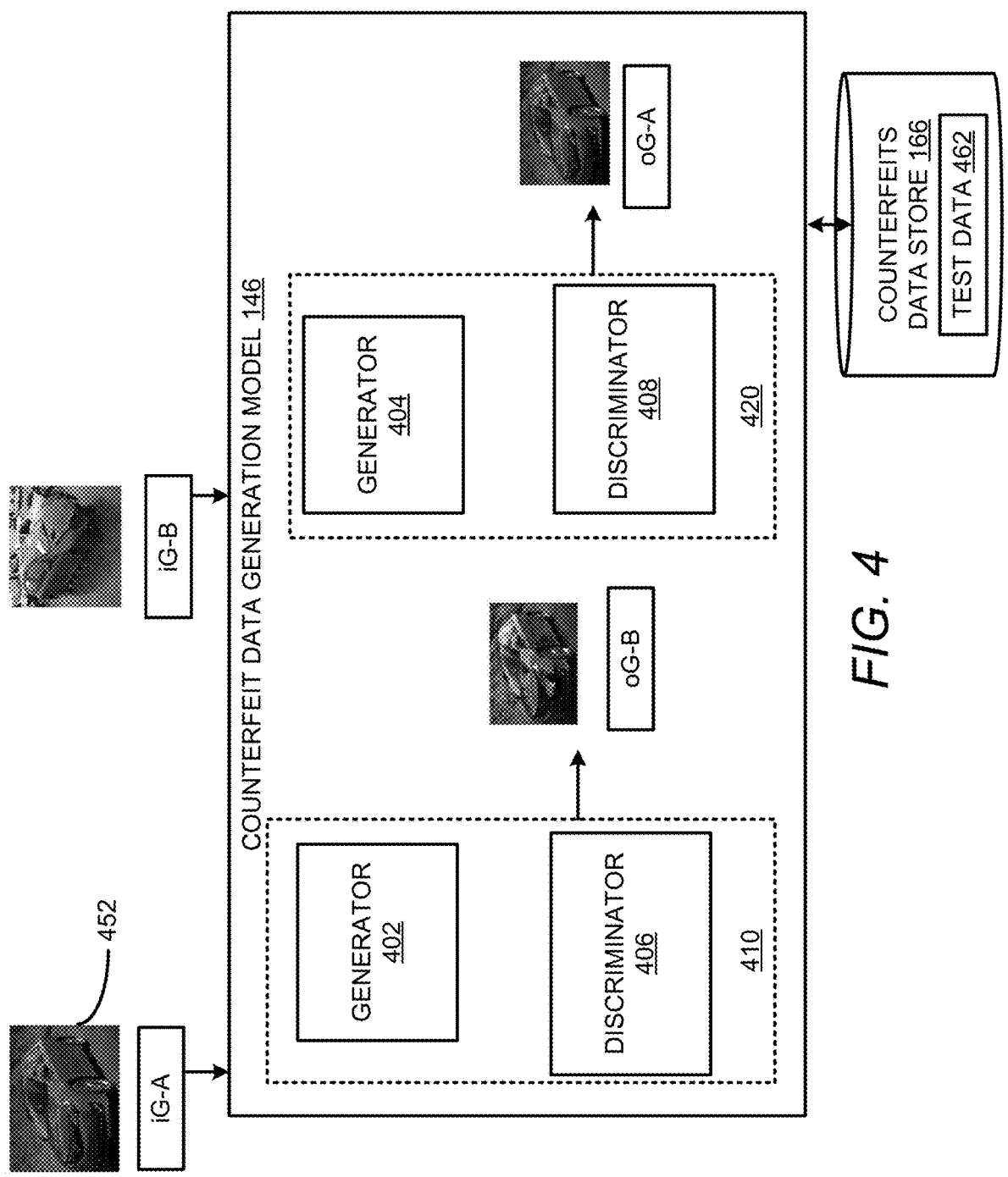
FIG. 4 show a block diagram of a counterfeit data generation model in accordance with the examples disclosed herein.

FIG. 4 show a block diagram of the counterfeit data generation model 146 in accordance with the examples disclosed herein. Although the counterfeit data generation model 146 discussed herein is based on CycleGANs which actually include two GANs that operate in tandem, this is not necessary. More number of generators and discriminators can be employed in the counterfeit data generation model 146 in accordance with other examples. Hence, CycleGANs include two generators and two discriminators that allow for unpaired data translations from one domain to another and vice versa. For two examples domains, images from a first domain such as domain A pertaining to images of good cars can be transformed into counterfeit damaged car images belonging to a second domain 'B' and vice versa. In an example, the DataLoader of PyTorch can be used to select the respective images for damaged and undamaged car domains. Accordingly, the counterfeit data generation model 146 includes two generators 402, 404 and two discriminators 406 and 408. A first generator-discriminator pair 410 including a generator 402 and discriminator 406 receives an input data sample, e.g., the good car image 452 from the first domain 'A' represented as iG-A and generates a first output image pertaining to the domain B, represented as oG-B as described above with respect to the patch generation model 142 or the perturbations generation model 144. Conversely, the second generator-discriminator pair 420 access original images of damaged cars from the domain B, e.g., iG-B and produces synthetic images of good cars pertaining to the domain A i.e., oG-A.

CycleGANs implement cycle consistency wherein the synthetic damaged images produced by the first generator-discriminator pair 410 for domain B are provided to the second generator-discriminator pair 420 and the resulting synthetic images of good cars for domain A are compared with the original good car images of domain A. Conversely, the synthetic damaged car images may be generated and compared with the original damaged car images. For a properly-trained generator-discriminator pair, it is expected that the synthetic images produced by the pair are indistinguishable from the original images. The generators 402, 404 are therefore regularized and guided in the image transformation process. The output images that show minimum differences with the input images may be stored as test data 462 to be used for testing the ML model under test 150.

Figure 5:
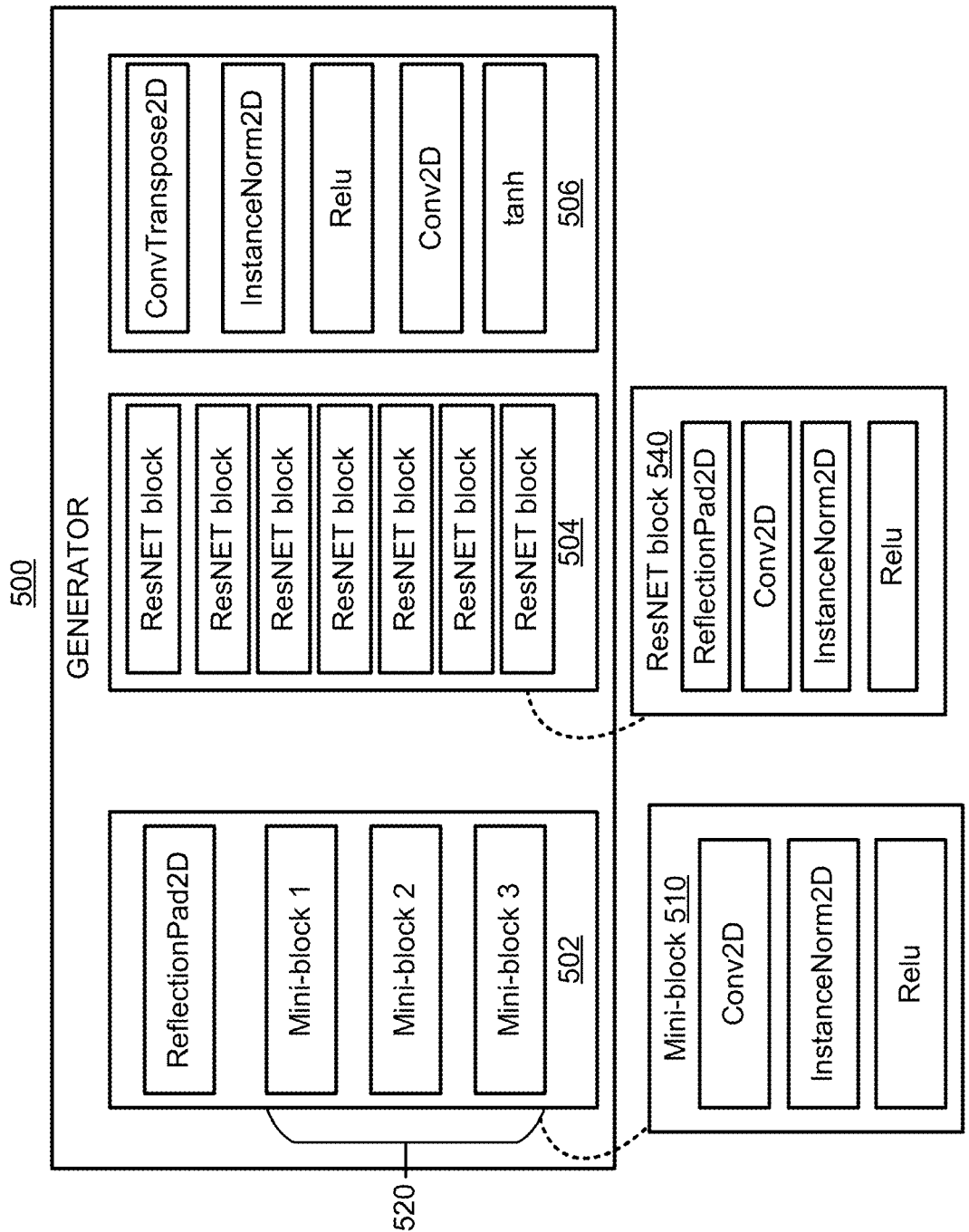
FIG. 5 shows a block diagram of a generator employed by the model testing system in accordance with the examples disclosed herein.

FIG. 5 shows a block diagram 500 of one of the generators employed by the model testing system 100 in accordance with the examples disclosed herein. The details are disclosed herein by way of illustration only. Other generators with different architectures may be employed by the model testing system 100 in accordance with the examples disclosed herein. In particular, the block diagram 500 shows the generator architecture for the counterfeit data generation model 146. The generation architecture includes but is not limited to three parts. Part one 502 contains ReflectionPad2D followed by three mini-blocks 520 with each mini-block 510 comprising of Conv2D, InstanceNorm2D and Relu. Part two 504 contains nine repetitions of ResNET block 540 which comprises of ReflectionPad2D, Conv2D, Instance Norm2D, and Relu. Part three 506 contains ConvTranspose2D, InstanceNorm2D, Relu, Conv2D and tan h. The total number of parameters is 11378179. The input to the generators is a three channel red green blue (RGB) image.

ReLU stands for Rectified Linear Unit for a non-linear operation. ReLU activation introduces non-linearity which means that the errors can be easily backpropagated with multiple layers of neurons being activated by the ReLU function in the ConvNet which would learn non-negative linear values from the real-world data.

Tan h is similar to logistic sigmoid function. The range of the tan h function is from (−1 to 1). Tan h is also sigmoidal (s-shaped). The advantage of tan h is that the negative inputs will be mapped strongly to negative outputs while the zero inputs are mapped near zero in the tan h graph. The function is differentiable. The function is monotonic while its derivative is not monotonic. The tan h function is mainly used in classification between two classes. Although different activation functions like tan, sigmoid can be used, Relu is selected for one example implementation of the generators. The output layer of generator includes tan h activation for yielding the best result.

The 2D convolution starts with a small matrix of weights called kernel. The kernel is the neural networks filter which moves across the image, scanning each pixel and converting the data into a smaller, or sometimes larger, format. The kernel slides over the 2D input data, performing an element-wise multiplication with the part of the input it is currently on, and then summing up the results into a single output pixel. The kernel repeats this process for every location it slides over, converting a 2D matrix of features into yet another 2D matrix of features. The output features are essentially, the weighted sums of the input features located roughly in the same location of the output pixel on the input layer.

Padding works by extending the area of an image being processed by a convolutional neural network (CNN). In order to assist the kernel with processing the image, padding is added to the frame of the image to allow for more space for the kernel to cover the image. Adding padding to an image processed by a CNN allows for more accurate analysis of images.

Sometimes when the images are too large, there is a need to reduce the number of trainable parameters. It is then desired to periodically introduce pooling layers between subsequent convolution layers. Pooling is done for reducing the spatial size of the image. Pooling is done independently on each depth dimension; therefore, the depth of the image remains unchanged. The most common form of pooling layer generally applied is the max pooling. In an example, the generators described herein use 2×2 maxPooling (5 layers).

ConvTranspose2D is very similar to the convolution operation, only that the convolution matrix is transposed. Therefore, the result is that the output grows instead of reducing (depending on the padding, stride and kernel size used).

InstanceNorm2D computes the mean/standard deviation and normalizes the results across each channel in each training example.

ReflectionPad2D pads the input tensor using the reflection of the input boundary.

The generators for the patch generation model 142 and the perturbations generation model 144 are generally based on ResNet architecture with upsampling layers, BatchNorm layers, Conv2D layers and ReLU activation layers. In an example, five of such layers were used with one of the five layers being an initial layer of ReflectionPad2d layer.

Figure 6:
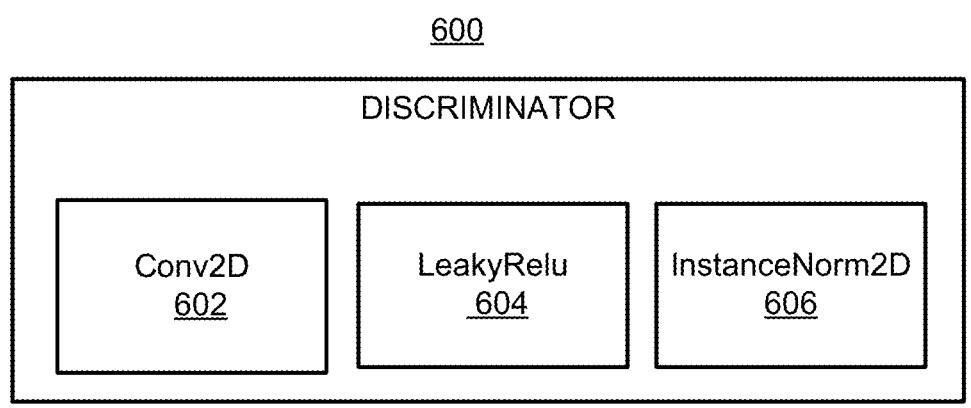
FIG. 6 includes a block diagram that shows the architecture of a discriminator in accordance with the examples disclosed herein.

FIG. 6 includes a block diagram that shows the architecture 600 of a discriminator in accordance with the examples disclosed herein. The discriminator, is generally an image classifier with six layers that include convolution layers. In the examples disclosed herein, a Leaky ReLU is used instead of ReLU as usage of ReLU leads to 'Dying ReLU problem' where some ReLU neurons essentially die for all inputs and therefore remain inactive regardless of the input supplied. Hence, no gradient flows and a large number of dead neurons in a neural network can erode the performance of the neural network. The Dying ReLU problem can be corrected by making use of Leaky Relu where the slope is moved to the negative x-axis i.e., to the left of x=0 and thus causing a leak thereby extending the range of ReLU. The discriminator architecture 600 includes but is not limited to, Conv2D 602, LeakyRelu 604 and InstanceNorm2D 606. The total number of parameters of the discriminator is 2764737.

Figure 7:
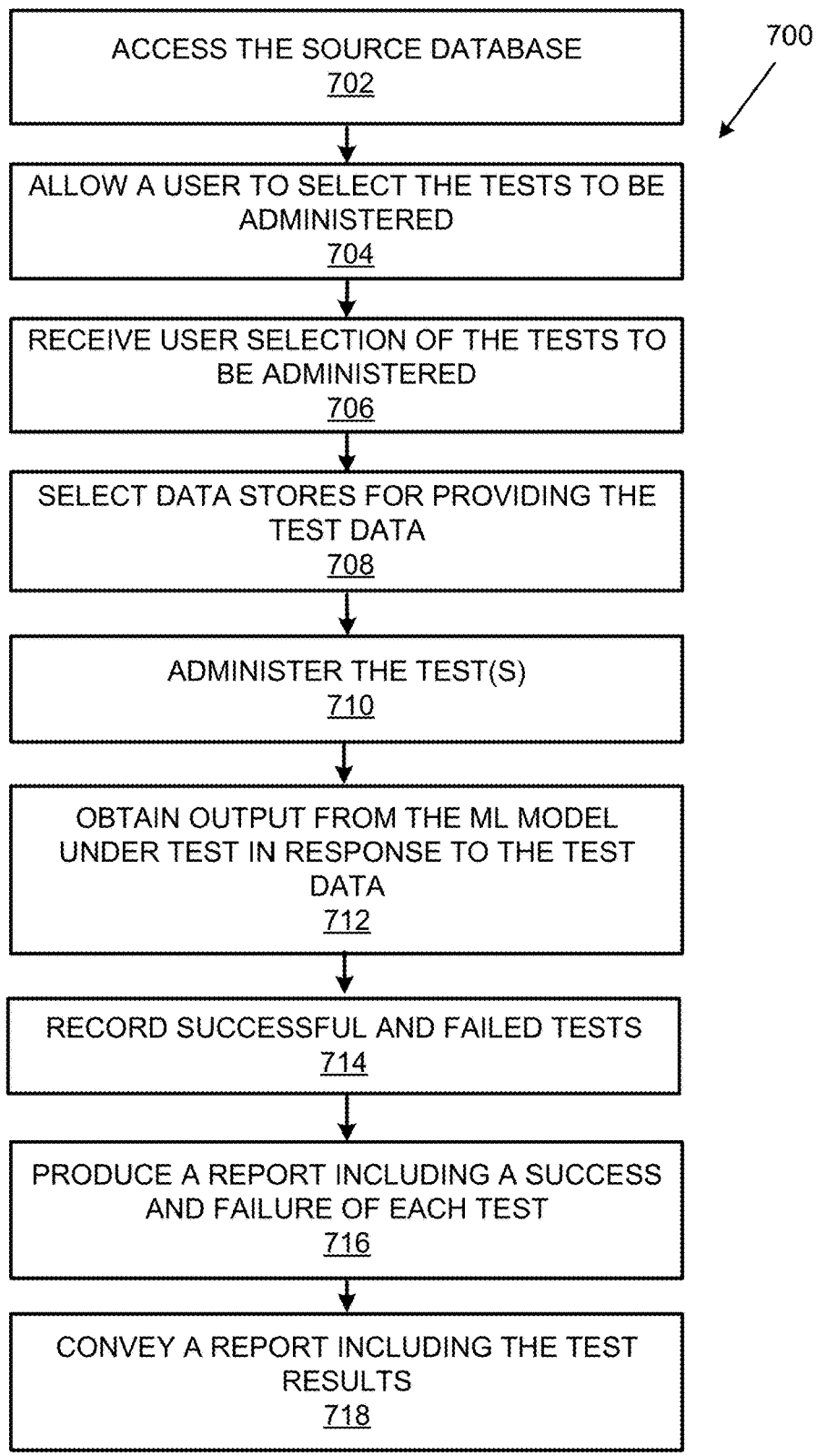
FIG. 7 shows a flowchart that details a method of testing ML models in accordance with an example disclosed herein.

FIG. 7 shows a flowchart 700 that details a method of testing ML models in accordance with an example disclosed herein. The method begins at 702 wherein the source database 170 that includes the data samples 172 used as training data for the ML model under test 150. The data samples 172 can include training data such as images used for supervised or unsupervised training of the ML model under test 150 for execution of tasks such as object recognition, image comparison, image classification, etc. In an example, the ML model under test 150 can be a part of an external system such as an automatic claim processing system which processes auto insurance claims via automatically analyzing images of damaged vehicles, identifying the damaged parts of the vehicles, determining the costs of the damaged parts and providing recommendations regarding claim settlements. In another example, the ML model under test 150 can be part of a health insurance claim settlement system which compares images of healthy body parts with those of unhealthy body parts as part of the claim settlement process.

At 704, the test selection interface 124 can present a UI that allows a user to select one or more tests to be administered to the ML model under test 150. The tests can include generative patches test, a generative perturbations test and a counterfeit data test. Each of the tests is administered using test data generated by a corresponding testing ML model that is trained to generate the test data. The generative patch test or the generative perturbations test involves providing data samples from the source database 170 which include images correspondingly modified with patches or perturbations as the test data. The counterfeit data test includes supplying counterfeit images which are generated based on the images from the source database 170 as test data to the ML model under test 150. The user's selection of one or more of the tests is received at 706. Based on the user's selection of the tests, one or more of the datastores 162, 164 and 166 are selected at 708 to provide the test data to the ML model under test 150. The tests can be executed at 710 on the ML model under test 150. In an example, the selected one or more tests can be serially administered. During the test, test data from one or more of the patches datastore 162, the perturbations datastore 164 and the counterfeit datastore 166 can be provided serially to the ML model under test 150 and the output from the ML model under test 150 is obtained at 712 for each of the administered test. If the output produced by the ML model under test 150 in response to the test data is accurate, a successful test is recorded, else, if the output is inaccurate, a failed test is recorded at 714 and the model report 168 regarding the success or failure of the ML model under test 150 is produced at 716. The model report 168 including the test results may be conveyed to the users at 718. The results can convey if the ML model under test 150 is robust or if additional training or modifications are required.

Figure 8:
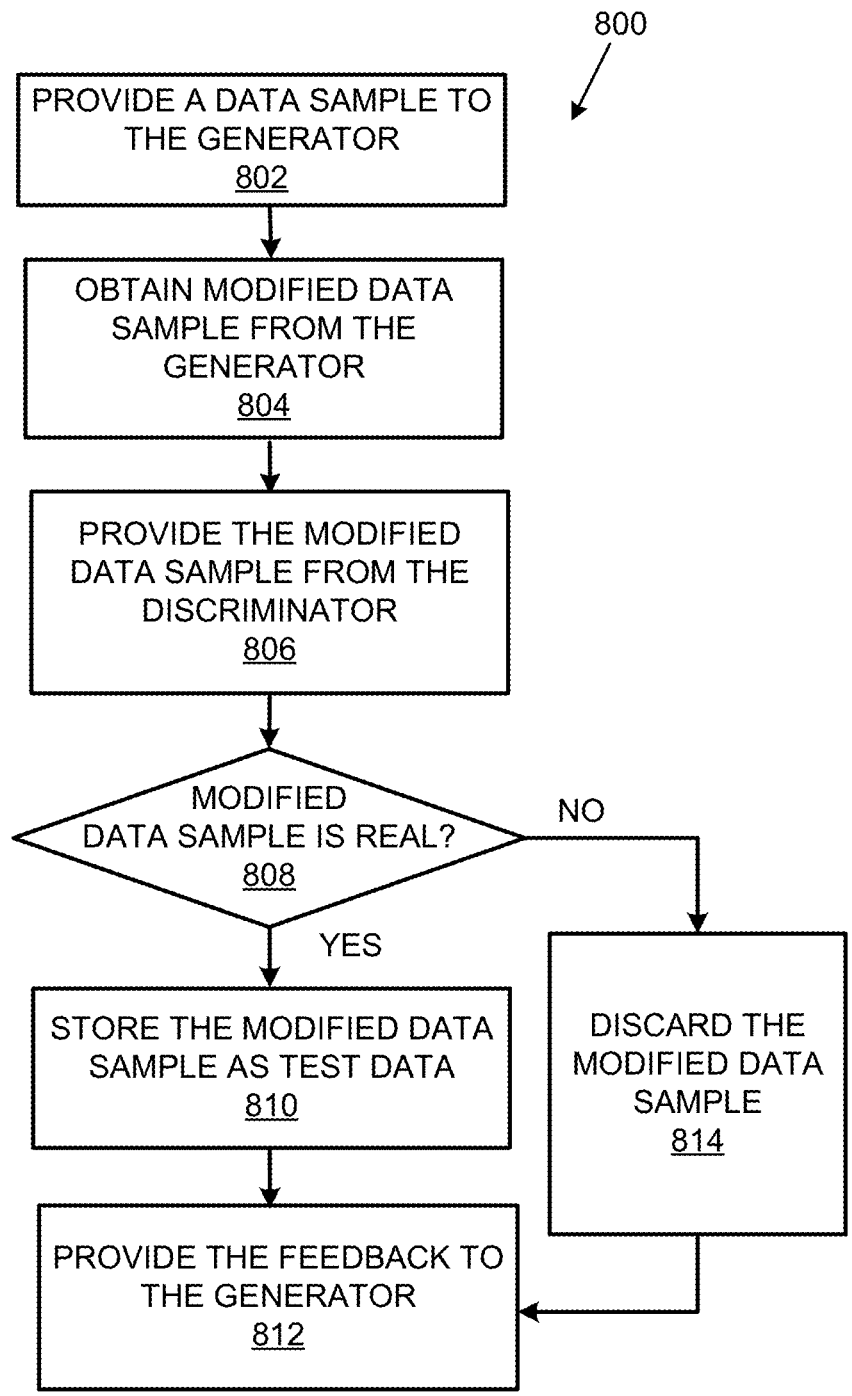
FIG. 8 shows a flowchart that details a method of generating test data in accordance with the examples disclosed herein.

FIG. 8 shows a flowchart 800 that details a method of generating the test data by one or more of the plurality of testing ML models 140 in accordance with the examples disclosed herein. The method begins at 802 wherein the data samples 172 from the source database 170 are provided to a generator included in one of the plurality of testing ML models 140. At 804, the data sample is modified by the generator to produce a modified data sample based on the particular one of the plurality of testing ML models 140 that includes the generator. If the generator is included in the patch generation model 142, the generator is trained to produce a modified data sample which includes an image with one or more of spatial and temporal features of the input data modified to cause the ML model under test 150 to return an incorrect result. If the generator is included in the perturbations generation model 144, the generator is trained to produce a modified data sample using a combination of unnoticeable (to a naked human eye) or nearly unnoticeable but significant changes distributed across the input which causes the ML model under test 150 to return an incorrect result. If the data sample at 804 is provided to a generator in the counterfeit data generation model 146, a counterfeit image that is similar to the original image received from the source database 170 is produced by the generator at 804. A similar counterfeit image in an example can include a counterfeit image that is identical to the original image in different aspects.

The modified data sample from the generator is provided to the discriminator at 806 along with a corresponding original image from the source database 170 which was modified by the generator. The discriminator is trained to produce probabilities regarding whether the modified data sample is from the source database 170 or a fake data sample that has been artificially synthesized by a generator. Based on the output from the discriminator, it is determined at 808 if the modified it data sample received by the discriminator is a real image from the source database 170 or a fake image. For example, the probability values can range from 0 to 1 where a 0 value indicates that the image is a fake image while a value of 1 indicates that the image is a real image. If it is determined at 808 that the image is a real image, then it implies that the generator is producing modified data samples that are close enough to the data samples 172 to fool the discriminator. Such data samples are stored at 810 in the corresponding one of the patches datastore 162, the perturbations datastore 164 or the counterfeits datastore 166 for use as test data. The method moves to 812 to provide the feedback to the generator. If it is determined at 808 that the modified data samples are fake images, then such modified data samples are discarded at 814 and the method moves to 812 to provide the feedback to the generator.

Figure 9:
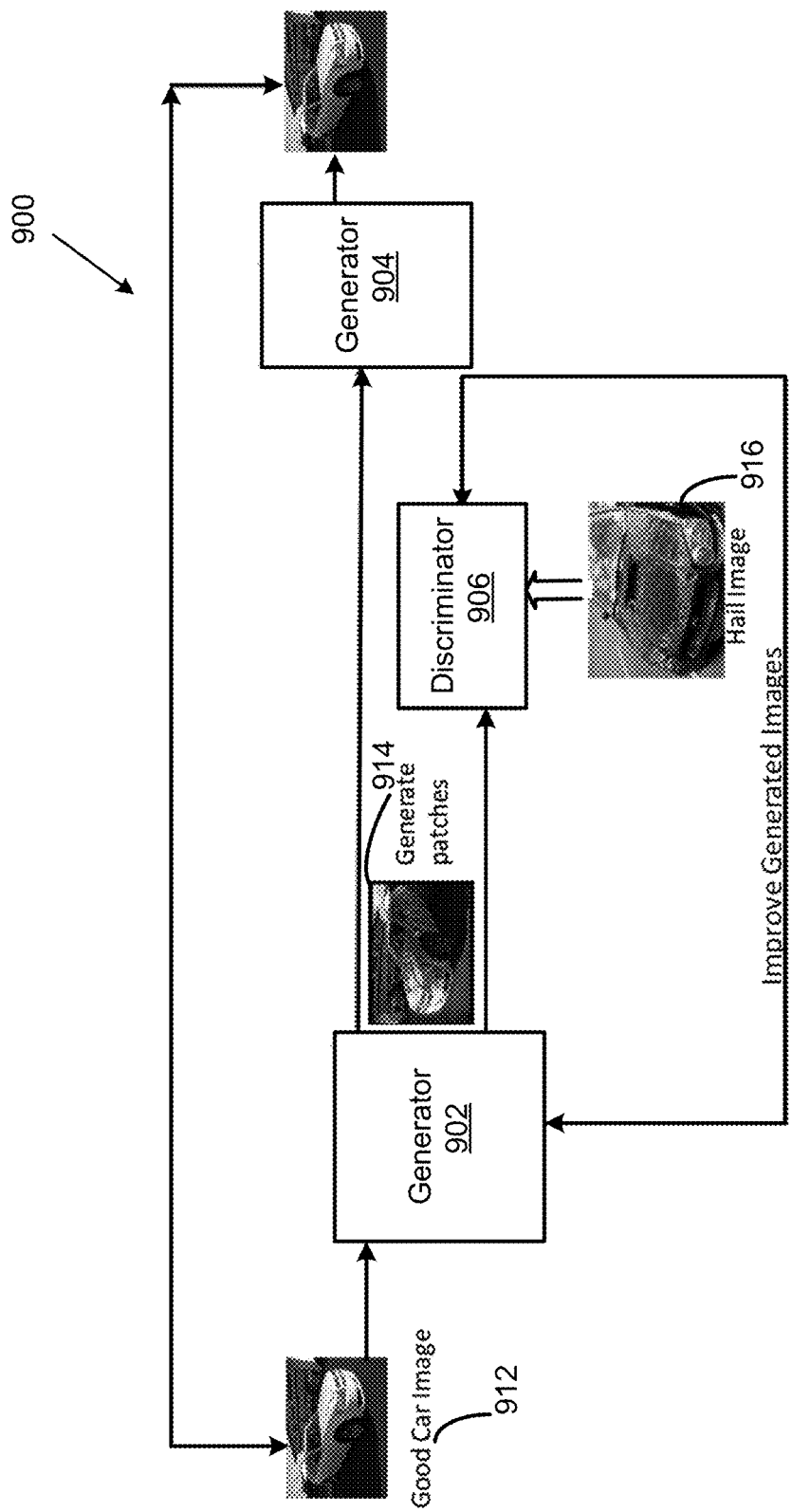
FIG. 9 illustrates a use case wherein the model testing system is employed in the insurance sector for fraud detection in accordance with the examples disclosed herein.

Shown below are different diagrams that illustrate the test data generation by the plurality of testing ML models 140. FIG. 9 illustrates a particular use case wherein the model testing system 100 is employed in the insurance domain for fraud detection in accordance with the examples disclosed herein. Various ML models which analyze images can be employed for automatic claim processing in the insurance sector. However, the various ML models need to be trained to differentiate genuine images from synthetic images in order that fraudulent or duplicate claims can be identified. An example patch generation model 900 is shown which includes a first car image generator 902 and a second car image generator 904 with a car image discriminator 906. The first car image generator 902 is configured to receive a good car image 910 and trained to generate patches so that a modified image 914 of the good car with the patches is synthesized. The modified image 914 is fed to the car image discriminator 906 along with a stream of genuine hail damaged car images which are similar to the example hail damaged car image 916. The car image discriminator 906 is trained via the hail damaged car images stream to produce a probability of whether the modified image 914 is a genuine image of a real hail-damaged car or a synthesized image. In an example, the second car image generator 904 is used to reconstruct the good car image 910 to produce a counterfeit good car image 916. L2-norm (also known as least squares nor) is used to manage the shape of the car in the counterfeit good car image 916 by minimizing the sum of the square of the differences (S) between the target value (Yi) and estimated values (f(x)). The good car image 916 thus produced can be fed back to the generator 902 as training data.

Figure 10:
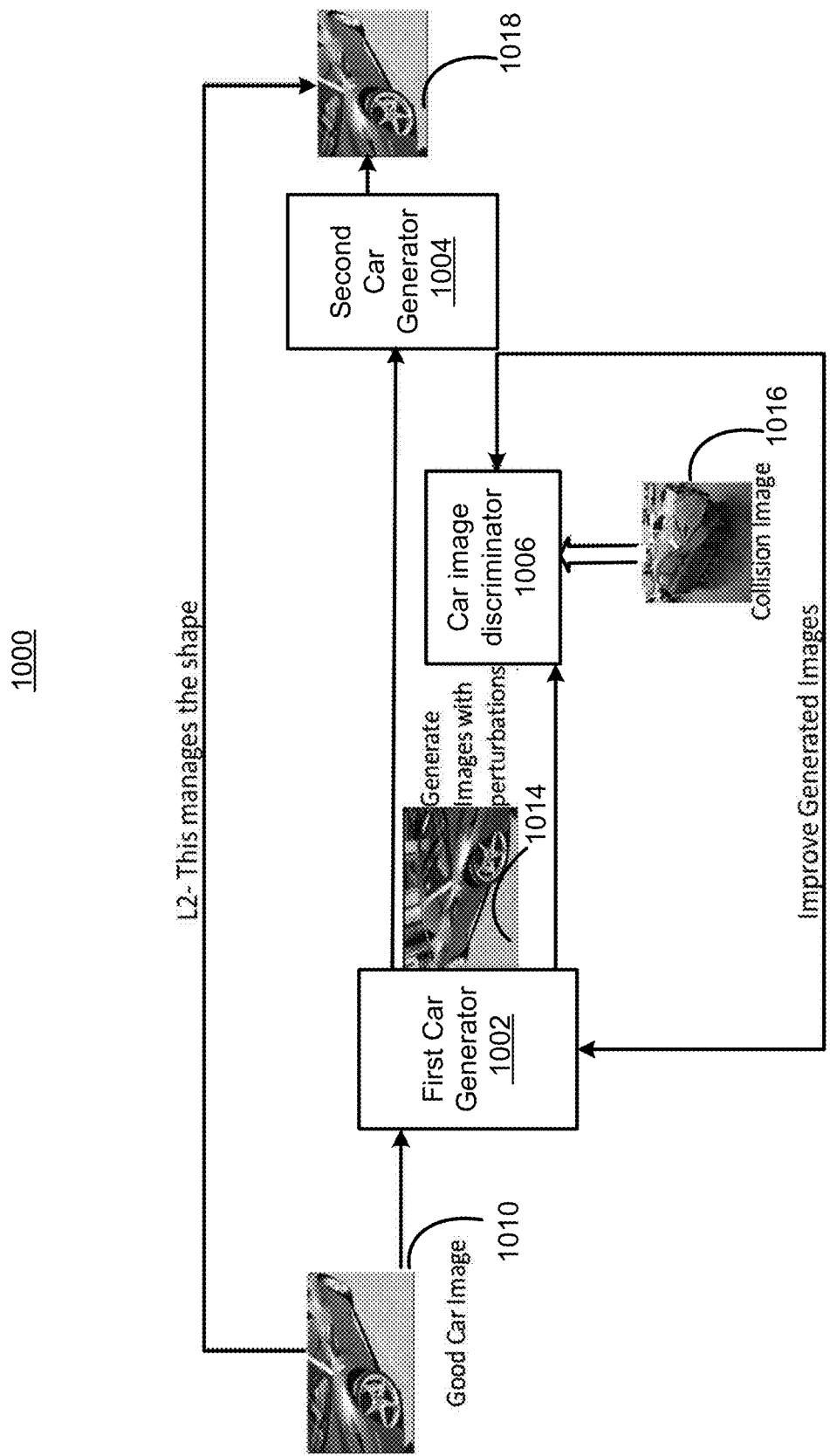
FIG. 10 shows a diagram of an example perturbations generation model implemented for identifying genuine, damaged car images.

FIG. 10 shows a diagram of an example perturbations generation model 1000 implemented for identifying genuine, damaged car images. Again, the example perturbations generation model 1000 includes a first car image generator 1002 and a second car image generator 1004 with a car image discriminator 1006. The first car image generator 1002 is configured to receive a good car image 1010 and trained to generate perturbations so that a modified image 1014 of the good car with the perturbations is synthesized. The modified image 1014 is fed to the car image discriminator 1006 along with a stream of genuine collision-damaged car images similar to the example collision damaged car image 1016. The car image discriminator 1006 is trained via the collision-damaged car images stream to produce a probability of whether the modified image 1014 is a genuine image of a real collision-damaged car or a synthesized image. In an example, the second car image generator 1004 is used to reconstruct the good car image 1010 to produce a counterfeit good car image 1018. L2-norm (also known as least squares norm) is used to manage the shape of the car in the counterfeit good car image 1018 by minimizing the sum of the square of the differences (S) between the target value (Yi) and estimated values (f(x)).

Figure 11:
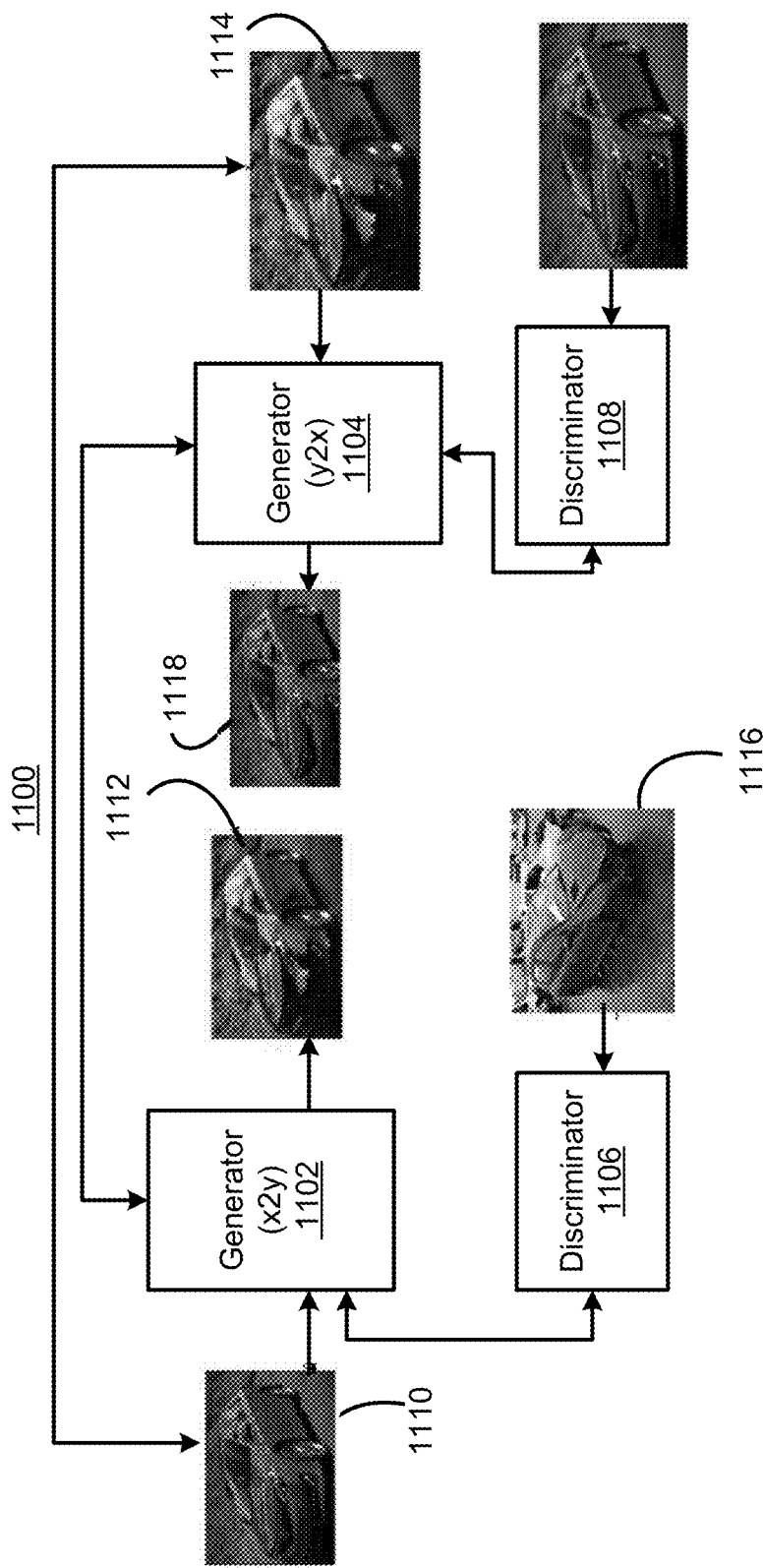
FIG. 11 shows a diagram of an example counterfeit data generation model implemented for identifying genuine, damaged car images.

FIG. 11 shows a diagram of an example counterfeit data generation model 1100 implemented for identifying genuine, damaged car images. The counterfeit data generation model 1100 includes two generators 1102 and 1104 and two discriminators 1106 and 1108. The first car image generator 1102 is configured to receive a good car image 1110 and generate a counterfeit damaged car image 1112. Thus, the first car image generator 1102 generates x2y transformations i.e., transforms images from the good car domain (x) to the damaged car domain (y). The first car image discriminator 1106 is configured to receive the counterfeit damaged car image 1112 along with a stream of genuine damaged car images similar to the example damaged car image 1116 shown in FIG. 11. The first car image discriminator 1106 is trained via the damaged car images stream to produce a probability of whether the modified image 1114 is a genuine image of a real damaged car or a synthetic image of a damaged car. In an example, the quality of the modified image 1114 can be determined by feeding the modified image 1114 to the second car image generator 1104.

The second car image generator 1104 generates y2x transformations i.e., transforms images from the damaged car domain (y) to the good car domain (x). The second car image generator 1104 is trained to produce or synthesize good car images from the counterfeit damaged car images such as the modified image 1114. The counterfeit good car image 1118 that is obtained from the second car image generator 1104 can be compared to the original good car image 1110 by the second discriminator 1108. If the probabilities produced by the second discriminator 1108 for the counterfeit good car image 1118 and the original good car image 1110 are similar, then it can be determined that the first car image generator 1102 is well trained and may be employed to produce counterfeit data for testing the ML model under test 150 to discriminate between images of real objects and artificially-synthesized images.

FIG. 12 illustrates a computer system 1200 that may be used to implement the model testing system 100. More particularly, computing machines such as desktops, laptops, smartphones, tablets and wearables which may be used to generate or access the data from the model testing system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.12x LAN, a 3G, 4G or 5G mobile WAN or a WiMax WAN, and a computer-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processor(s) 1202 to perform the methods and functions of the model testing system 100.

The model testing system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the model testing system 100. The operating system 1262 may be multi-user, multiprocessing, multitasking, multithreading, real-time and the like. For example, during runtime, the operating system 1262 is running and the code for the model testing system 100 is executed by the processor(s) 1202.

The computer system 1200 may include a data storage 1212, which may include non-volatile data storage. The data storage 1210 stores any data used by the model testing system 100. The data storage 1210 may be used to store the various genuine or synthetic images, and other data that is used by the model testing system 100.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A machine learning (ML) based model testing system comprising:
   at least one processor;
   a non-transitory processor readable medium storing machine-readable instructions that cause the processor to:
   receive a selection of one or more tests to be administered to a ML model under test, wherein the one or more tests include at least one of a generative patches test, a generative perturbations test and a counterfeit data test;
   access a source database that stores training data with data samples that are used for training the ML model under test;
   provide at least a subset of the data samples from the source database to one or more of a plurality of testing ML models that correspond to the selected one or more tests;
   obtain modified data samples from the one or more testing ML models that correspond to the selected one or more tests, wherein the modified data samples are produced by the one or more testing ML models from the subset of data samples;
   execute each of the selected one or more tests on the ML model under test using the modified data samples; and
   generate a report that includes results of the selected one or more tests, the results conveying a successful test or an unsuccessful test for each of the selected one or more tests, wherein the successful test pertains to the ML model under test producing accurate results and the unsuccessful test pertains to the ML model under test producing inaccurate results.

2. The ML model testing system of claim 1, further comprising instructions that cause the processor is to:
   train the plurality of testing ML models for generating the modified data samples using unsupervised learning.

3. The ML model testing system of claim 1, wherein to receive the selection of one or more tests to be administered, the processor is to:
   provide a user interface (UI) that presents options for the selection of the one or more tests to be administered to the ML model under test.

4. The ML model testing system of claim 1, further comprising instructions that cause the processor is to:
   store the modified data samples from each of the plurality of ML testing models to a respective test datastore.

5. The ML model testing system of claim 4, wherein to execute each of the selected one or more tests on the ML model under test, the processor is to:
   select the modified data samples to provide to the ML model under test from one or more of the respective test datastores based on the selected one or more tests to be administered.

6. The ML model testing system of claim 1, wherein the ML model under test includes one of an image classifier and an image search model and the data samples include images that are used for training the ML model under test.

7. The ML model testing system of claim 6, wherein each of the plurality of testing ML models includes a generative adversarial network (GAN).

8. The ML model testing system of claim 7, wherein each of the testing ML models includes at least a generator and a discriminator.

9. The ML model testing system of claim 7, wherein the one or more testing ML models include at least a patch generation model and to obtain the modified data samples from the patch generation model during the generative patches test, the processor is to:
   obtain as output from the patch generation model, the subset of data samples modified with patches that include modifications to one or more of temporal and spatial features of the subset of data samples.

10. The ML model testing system of claim 7, wherein the one or more testing ML models include at least a perturbations generation model and to obtain the modified data samples from the perturbations generation model during the generative perturbations test, the processor is to:
    obtain as output from the perturbation generation model, the subset of data samples modified with perturbation that include modifications to one or more pixels of the images in the subset of data samples.

11. The ML model testing system of claim 7, wherein the one or more testing ML models include at least a counterfeit data generation model and to obtain the modified data samples from the counterfeit data generation model during the counterfeit data test, the processor is to:
    obtain as output from the counterfeit data generation model, counterfeit images that are generated based on the images in the subset of data samples.

12. A method comprising:
    training a plurality of testing machine learning (ML) models to produce corresponding modified data samples from a source database that stores training data with data samples that are used for training a ML model under test, the plurality of testing ML models corresponding to a plurality of tests to be administered to the ML Model under test;
    receiving a selection of one or more of the plurality of tests to be administered to the ML model under test;
    providing at least a subset of the data samples from the source database to one or more of the plurality of testing ML models that correspond to the selected one or more tests;
    executing the selected one or more tests on the ML model under test using modified data samples that are obtained by providing the subset of the data samples to the one or more testing ML models that correspond to the selected one or more tests; and
    generating a model report with results of the selected one or more tests administered to the ML model under test, the results including indications for successful test results wherein the ML model under test produces accurate results and unsuccessful test results wherein the ML model under test produces inaccurate results.

13. The method of claim 12, wherein the modified data samples include one or more images with patches and perturbations and the ML model under test includes an object recognition ML model and the successful test includes the object recognition ML model identifying previously-viewed objects from the modified data samples.

14. The method of claim 12, wherein the modified data samples include counterfeit images generated by one of the plurality of testing ML models and genuine images from the source database and the ML model under test includes an image search ML model and a successful test result includes the image search ML model identifying the counterfeit images.

15. The method of claim 12, further comprising:
obtaining the modified data samples by providing the data samples from the source database to the one or more testing ML models.

16. The method of claim 15, further comprising:
modifying one or more of spatial and temporal data of images included in the subset of data samples by a generator of a patch generation model included in the plurality testing ML models wherein each of the plurality of testing ML models includes a generative adversarial network (GAN).

17. The method of claim 16, further comprising:
providing the modified images to a discriminator included in the patch generation model;
identifying one or more of the modified images that the discriminator fails to identify as including the modified spatial and temporal data; and
providing to the ML model under test, the one or more of the modified images that the discriminator fails to identify as modified images.

18. A non-transitory processor-readable storage medium comprising machine-readable instructions that cause a processor to:
receive a selection of one or more tests to be administered to a ML model under test, wherein the one or more tests include at least one of a generative patches test, a generative perturbations test and a counterfeit data test;
access a source database that stores training data with data samples that are used for training the ML model under test;
provide at least a subset of the data samples from the source database to one or more of a plurality of testing ML models that correspond to the selected one or more tests;
obtain modified data samples from the one or more testing ML models that correspond to the selected one or more tests, wherein the modified data samples are produced by the one or more testing ML models from the subset of data samples;
execute each of the selected one or more tests on the ML model under test using the modified data samples; and
generate a report that includes results of the executed one or more tests, the results conveying a successful test or an unsuccessful test for each of the selected one or more tests, wherein the successful test pertains to the ML model under test producing accurate results and the unsuccessful test pertains to the ML model under test producing inaccurate results.

19. The non-transitory processor-readable storage medium of claim 18, wherein each of the plurality of testing ML models includes a generative adversarial network (GAN) that includes at least a generator and a discriminator and the data samples includes images.

20. The non-transitory processor-readable storage medium of claim 19, further comprising instructions that cause the processor to:
provide the images with modified pixel data as to a discriminator included in a perturbation generation model that forms one of the plurality of testing ML models;
identify one or more of the modified images that the discriminator fails to identify as including the modified pixel data; and
provide to the ML model under test as test data, the one or more of the modified images that the discriminator fails to identify as the modified data samples.

* * * * *